(12) United States Patent
Jin et al.

(10) Patent No.: US 11,579,082 B2
(45) Date of Patent: Feb. 14, 2023

(54) METHOD AND A SYSTEM FOR DETECTING ROAD ICE BY SPECTRAL IMAGING

(71) Applicant: SpringGem Weather Information, LLC, North Potomac, MD (US)

(72) Inventors: Menglin Susan Jin, North Potomac, MD (US); Jianming Yuan, Boyds, MD (US)

(73) Assignee: SpringGem Weather Information, LLC, North Potomac, MD (US)

( * ) Notice: Subject to any disclaimer, the term of this patent is extended or adjusted under 35 U.S.C. 154(b) by 0 days.

(21) Appl. No.: 17/410,113

(22) Filed: Aug. 24, 2021

(65) Prior Publication Data

US 2022/0057325 A1 Feb. 24, 2022

Related U.S. Application Data

(60) Provisional application No. 63/069,663, filed on Aug. 24, 2020.

(51) Int. Cl.
| | | |
|---|---|---|
| *G01N 21/55* | (2014.01) | |
| *G01N 21/31* | (2006.01) | |
| *G06V 20/56* | (2022.01) | |

(52) U.S. Cl.
CPC ........... *G01N 21/55* (2013.01); *G01N 21/314* (2013.01); *G06V 20/56* (2022.01)

(58) Field of Classification Search
None
See application file for complete search history.

(56) References Cited

U.S. PATENT DOCUMENTS

| 5,739,536 A | * | 4/1998 | Bucholtz | G01J 3/0291 |
| | | | | 250/341.2 |
| 2008/0129541 A1 | * | 6/2008 | Lu | G06V 10/143 |
| | | | | 340/905 |
| 2019/0217864 A1 | * | 7/2019 | Kusukame | G01C 21/3691 |
| 2019/0331832 A1 | * | 10/2019 | Chandra | G01W 1/06 |

OTHER PUBLICATIONS

Xiao, X. et al. "Assessing the potential of Vegetation sensor data for mapping snow and ice cover: a Normalized Difference Snow and Ice Index." International Journal of Remote Sensing 22.13 (2001): 2479-2487 (Year: 2001).*

(Continued)

*Primary Examiner* — Tarifur R Chowdhury
*Assistant Examiner* — Roberto Fabian, Jr.
(74) *Attorney, Agent, or Firm* — SZDC Law P.C.

(57) ABSTRACT

A method for detecting an ice on a road surface includes: providing a spectral imaging camera; recording a first reflectance (R1) of the surface at 0.545 to 0.565 μm using the spectral imaging camera; recording a second reflectance (R2) of the surface at 0.620 to 0.670 μm using the spectral imaging camera; recording a third reflectance (R3) of the surface at 0.841 to 0.876 μm using the spectral imaging camera; calculating an ice index based on the first reflectance, the second reflectance, and the third reflectance; providing a thermometer; recording a surface temperature of the surface using the thermometer; and detecting a presence of the ice on the surface based on the ice index and the surface temperature. A system for detecting an ice on a surface is also disclosed.

10 Claims, 19 Drawing Sheets

(56) References Cited

OTHER PUBLICATIONS

Hyun, C.-U. et al. "Evaluation of Spectral Indices for Differentiating Melt Pond from Sea Ice." (2015) (Year: 2015).*
Muhsin, I. et al., "Assessment of vegetal cover changes using Normalized Difference Vegetation Index (NDVI) and subtractive (NDVI) time-series, Karbala province, Iraq" Iraqi Journal of Physics, 2017, vol. 15, No. 35, pp. 133-141 (Year: 2017).*
Candiago, S. et al. "Evaluating multispectral images and vegetation indices for precision farming applications from UAV images." Remote sensing 7.4 (2015): 4026-4047 (Year: 2015).*
Dixit, A. et al., "Development and evaluation of a new "Snow Water Index (SWI)" for accurate snow cover delineation." Remote Sensing 11.23 (2019): 2774 (Year: 2019).*
12. Daughtry, Craig ST, et al. "Estimating corn leaf chlorophyll concentration from leaf and canopy reflectance." Remote sensing of Environment 74.2 (2000): 229-239 (Year: 2000).*

\* cited by examiner

METHOD AND A SYSTEM FOR DETECTING ROAD ICE BY SPECTRAL IMAGING

This application claims priority to U.S. Provisional Patent Application No. 63/069,663, filed on Aug. 24, 2020, which is incorporated by reference for all purposes as if fully set forth herein.

FIELD OF THE INVENTION

The present invention relates to a method and a system for detecting road ice by spectral imaging.

BACKGROUND OF THE INVENTION

Between 2002 and 2012, winter weather was the cause for 540,000 car collisions (10% of collisions annually), 150,000 car-related injuries and 1,900 car-related fatalities, according to the U.S. Federal Highway Administration. The risk of vehicle crashes significantly increases because of the presence of winter precipitation. Hazards associated with winter weather also have significantly impacts on public transportation and commerce, since ice or snow on ground leads to slower speeds, reduced reliability, dense traffic congestion, and more accidents. Winter road conditions besides dry (e.g., wet, icy, snow) should be closely reported, in a cold-freezing winter.

The combination of precipitation and sub-freezing temperatures are the two key parameters for icy road formation. Wind is the third important parameter for reducing temperature. Winter storms with heavy snow can apparently cause the road problem. In addition, freezing rain is a particularly dangerous form of precipitation. Further-more, even precipitation falls to the surface as a liquid can freezes at the surface where temperatures are below the freezing point. Besides the weather conditions, road texture also plays a role on ice formation. An example is that the bridges or road shoulders, with even slight slope at the surface, can lead to ice formation much easily, when temperature and water conditions are optimal, due to the micro-scale turbulences near ground.

There are two primary modes for ice to form on roadways irrespective of frozen precipitation: (1) freezing of pooled rain water and (2) freezing of condensed water from the air along the surface. Rain can be in liquid form during daytime hours but freeze overnight as the temperatures decrease. Alternatively, in very humid locations, water vapor can condense onto roads in sub-freezing conditions. This is known as frost or hoarfrost, which can form black ice in areas not commonly associated with snow or ice. Both of these methods of road ice production create dangerous driving conditions outside of the setting of a winter storm or wintery precipitation. This makes forecasting and identification of road ice formation more challenging.

Remotely sensed road icy status would alert drivers to slow speed and thus reduce risk on the road. In addition, highway maintenance administration in Department of Transportation need road ice conditions to de-ice treatment to clear road. Many other users, for example, an airport facility manager also need to detect road ice condition on the airport for a safe landing of airplane.

There is a need for a method and a system for accurately and conveniently detecting ice on road.

SUMMARY OF THE INVENTION

In one embodiment, a method for detecting an ice on a surface includes: providing a spectral imaging camera; recording a first reflectance (R1) of the surface at a green band using the spectral imaging camera; recording a second reflectance (R2) of the surface at a red band using the spectral imaging camera; recording a third reflectance (R3) of the surface at a near infrared band using the spectral imaging camera; calculating an Ice Index based on the first reflectance, the second reflectance, and the third reflectance; providing a thermometer; recording a temperature of the surface using the thermometer; and detecting a presence of the ice on the surface based on the Ice Index and the temperature of the surface.

In another embodiment, the green band has a band width of 0.545 to 0.565 μm.

In another embodiment, the red band has a band width of 0.620 to 0.670 μm.

In another embodiment, the near infrared band has a band width of 0.841 to 0.876 μm.

In another embodiment, the surface is a road surface.

In another embodiment, the Ice Index is an ENDVI Ice Index, following the well-accepted Normalized Difference Vegetation Index (NDVI) formula but using GREEN channel instead of RED channel in NDVI formula. The ENDVI Ice Index is calculated by a following Equation (1):

$$\text{the ENDVI Ice Index} = (R3-R1)/(R3+R1) \quad \text{Equation (1).}$$

In another embodiment, the presence of the ice on the surface is detected when the ENDVI Ice Index is between −0.30 to −0.02 using Equation (1), and the temperature of the surface is less than 32 degrees Fahrenheit.

In another embodiment, the Ice Index is calculated by a following Equation (2):

$$\text{the Ice Index} = (R3-R1)/(R3+R1)*(R1/R2) \quad \text{Equation (2).}$$

In another embodiment, the presence of the ice on the surface is detected when the Ice Index is between −0.30 to −0.03 using Equation (2), and the temperature of the surface is less than 32 degrees Fahrenheit.

In another embodiment, the temperature of the surface is a road surface skin temperature.

In another embodiment, the spectral imaging camera is mounted on a drone.

In another embodiment, a system for detecting an ice on a surface includes: a spectral imaging camera, the spectral imaging camera recording a first reflectance (R1) of the surface at a green band, a second reflectance (R2) of the surface at a red band, and a third reflectance (R3) of the surface at a near infrared band; a thermometer, the thermometer recording a temperature of the surface; and a computer unit, the computer unit calculating an Ice Index based on the first reflectance, the second reflectance, and the third reflectance, and detecting a presence of the ice on the surface based on the Ice Index and the temperature of the surface.

In another embodiment, the system for detecting an ice on a surface further includes a drone. The spectral imaging camera is mounted on the drone.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings.

The present invention provides a method for detecting icy road from remote sensing using spectral radiometer in visible (vis) and near-infrared bands (NIR), together with a thermal temperature threshold.

Reflectivity is the fraction of incident radiation reflected by a surface. The reflectance characteristics of a surface may be quantified by measuring the portion of incident energy that is reflected. It can be measured as a function of wavelength ($\lambda$) and is called spectral reflectance ($\Gamma_\lambda$)

Different materials, including different snow and liquid water ratio, have different spectral reflectance at a given wavelength. This is so-called spectral signature of the material, and it has been used in remote sensing to retrieve the presence of the material.

Figure 1:
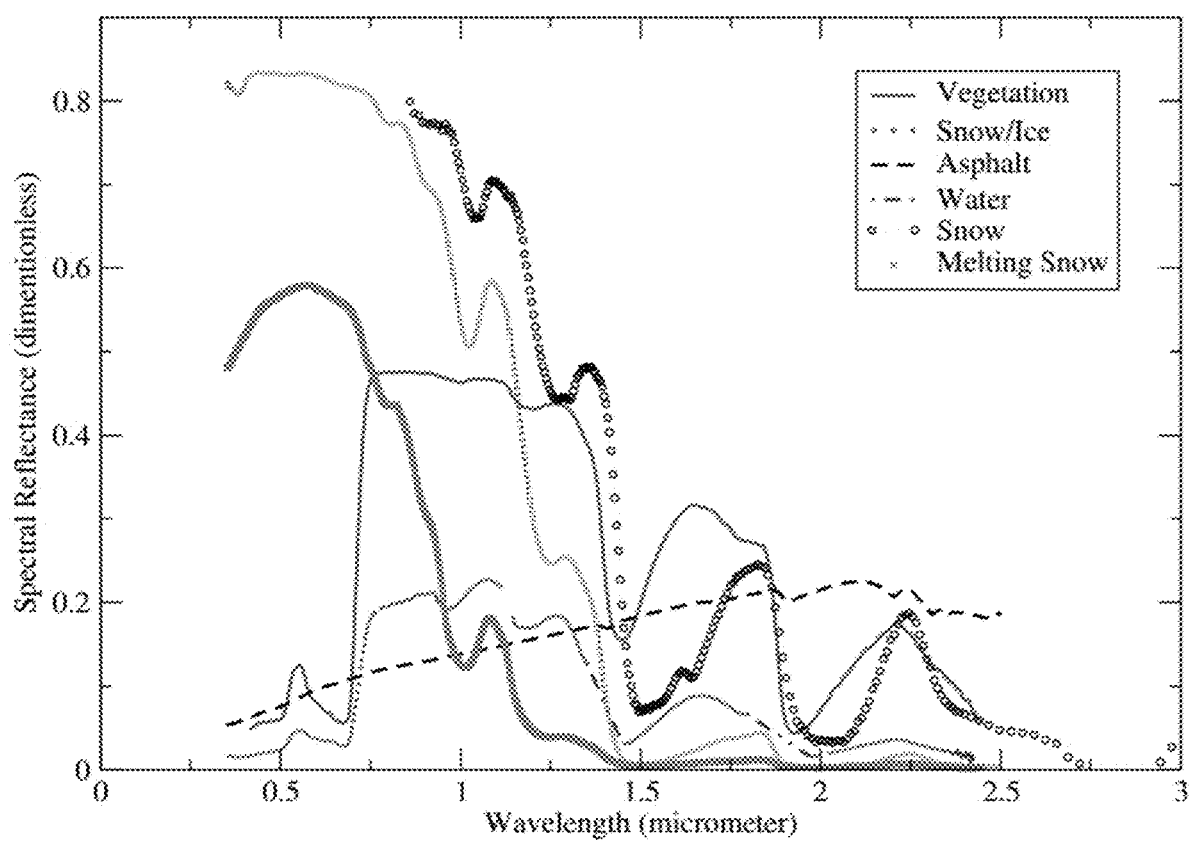
FIG. 1 shows the spectral reflectance measurements for asphalt, water, snow, melting snow, and vegetation (Aspen). Measurements are provided in USGS spectral library.

FIG. 1. Spectral reflectance measurements for asphalt, water, snow, melting snow, and vegetation (Aspen). (Data used in Figure is from USGS spectral library crustal.usgs.gov/speclab Base Spectra (splib07a)).

In certain embodiment, the method uses remotely sensed hyperspectral reflectance to identify icy road. Ice sheet, thing or thick, has spectral reflectance ($\Gamma_\lambda$) significantly different at near infrared band and at visible bands (FIG. 1), comparing to asphalt, water, and vegetation. By using the combination of visible band and near-infrared band (NIR), ice covered road can be differed from dry asphalt surfaces (i.e., road surfaces) and water-covered road. Specifically, Road Ice Index (RI) is defined as:

$$\text{The ENDVI Ice Index} = (R3-R1)/(R3+R1) \quad \text{Eq. (1)},$$

$$\text{The Ice Index} = (R3-R1)/(R3+R1)*(R1/R2) \quad \text{Eq. (2)}.$$

RED is the spectral reflectance for red band, GREEN is the spectral reflectance for green band. Green band is 0.545 to 0.565 µm. Red band is the edge of visible band at close to 0.620 to 0.670 µm. NIR is the near-infrared region of the electromagnetic spectrum (from 0.78 µm to 2.5 µm). The method uses 0.841 to 0.876 µm to follow NASA MODIS instrument spectral bands. For snow and ice, spectral reflectance $\Gamma_\lambda$ reduces from GREEN, RED to NIR and thus RI is negative; while for asphalt surfaces, $\Gamma_\lambda$ increases from RED to NIR and thus has a positive RI. As a result, icy road can be detected using combination of GREEN, RED and NIR bands. Nevertheless, depending on the accuracy of hyperspectral calibration, the method may need to use more bands, such as blue band or other bands with evident spectral difference for dry, wet, snow and icy roads identification (FIG. 1). ENDVI is following the well-accepted Normalized Difference Vegetation Index (NDVI) formula but uses GREEN channel in Eq. (1) instead of RED channel in NDVI formula.

In certain embodiment, the method distinguishes snow, dry and wet roads from remote sensing. Based on spectral signatures of different land cover, the method uses the most sensitive bands of snow/ice, water, and dry asphalt roads to develop a quick-classifying algorithm with adequate accuracy and reasonable cost for real world road maintenance use. In addition, the method needs to identify dry road and other road conditions (snow, icy, and wet) based on road surface skin temperature (i.e., the thermal threshold) to detect wet versus icy roads.

Experimental Results

1. Dry Vs. Ice-Covered Asphalt Surface

Figure 2A:
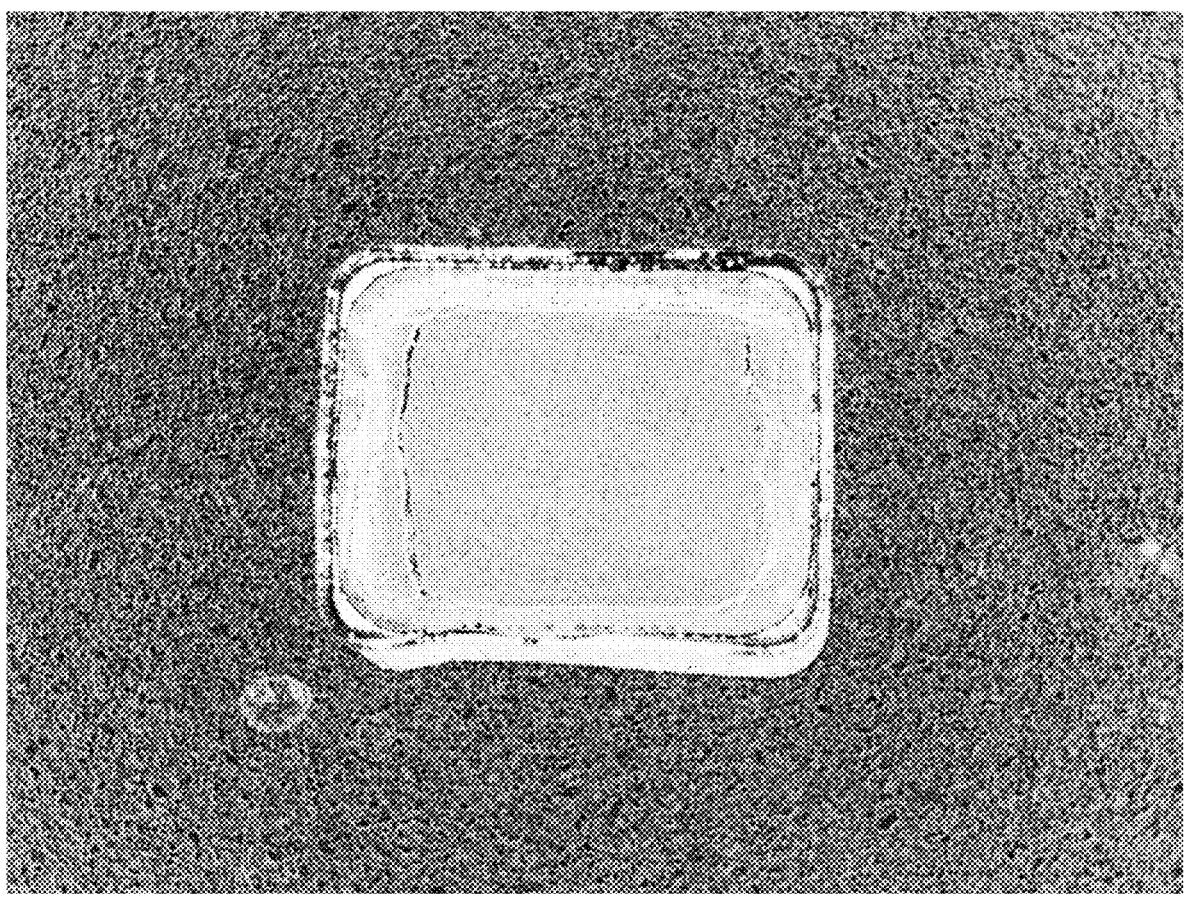
FIG. 2A is the spectral image of a piece of asphalt on a flat sidewalk.

A set of lab experiments were designed to calculate road ice index (RI) in sky conditions. First, a tray with asphalt placed at the bottom was put on a flat sidewalk (FIG. 2A) and a spectral imaging camera (Survey 3N camera) was used to measure the reflectance of this surface at Green, Red, and NIR bands. Then the reflectance of each band was calibrated and further used in RI calculation. Note a low RI at the left part across the tray due to the slight crack on the asphalt, which was on purposely designed to reflect the aging of road asphalt surface, a normal situation for road ice detection. If removing crack all asphalt RI were positive (>0.1). The experiment showed that dry asphalt surface has a positive RI from 0.1 to 0.33 due to a larger spectral reflectance in NIR than in GREEN, and larger in RED than in Green bands, consistent with the spectral measurements in FIG. 1.

Table 1 shows spectral reflectance of different surfaces at various wavelengths. Data is from USGS Spectral Library Version 7, Kokaly et al. 2017. RI based on Eq. (1) and RI based on Eq. (2) are listed in Table 1. Water is water surface with 20% vegetation; water+montmor is when water is added to montmor and the two materials are stirred.

3. Aging of Ice and Ice Melt

Figure 3:
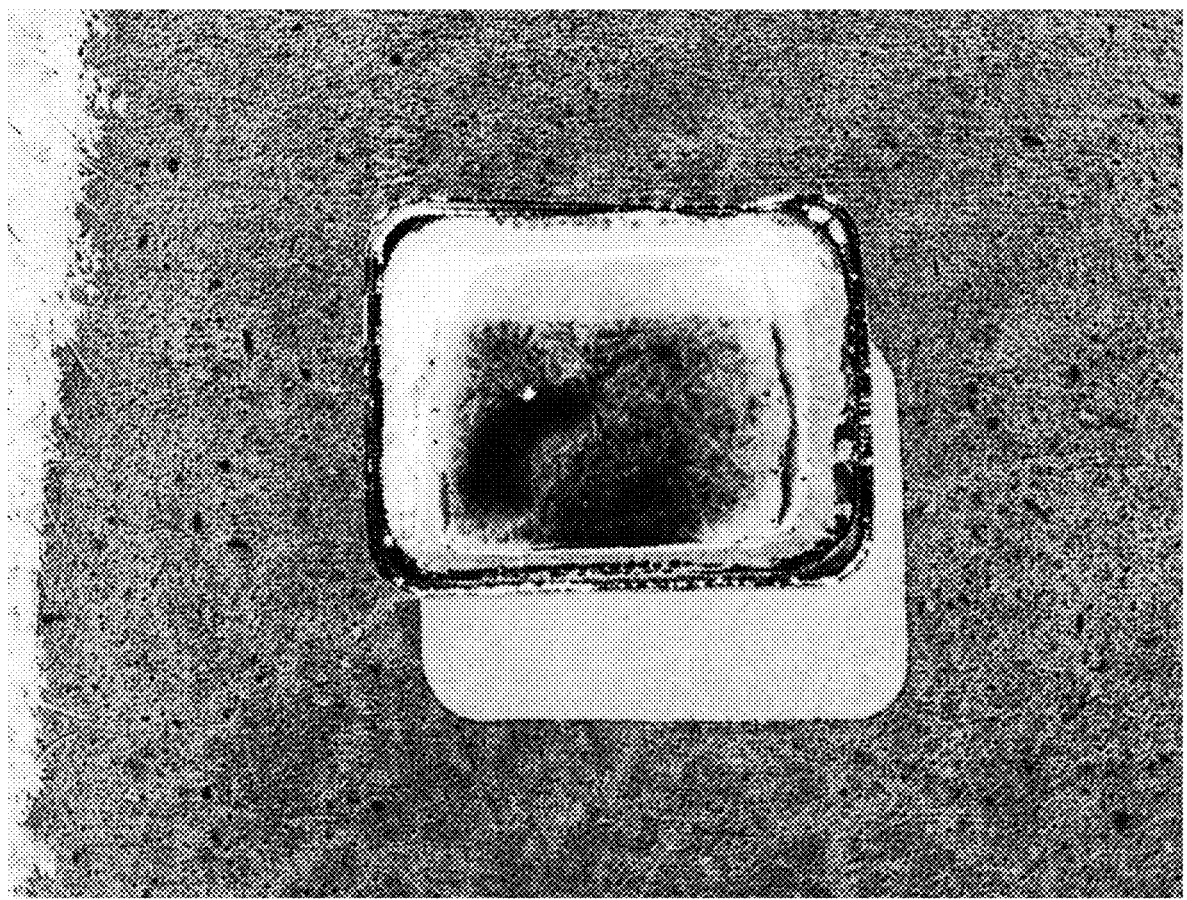
FIG. 3 is the spectral image of a piece of asphalt with an ice sheet slightly melted on a flat sidewalk.
Figure 4A:
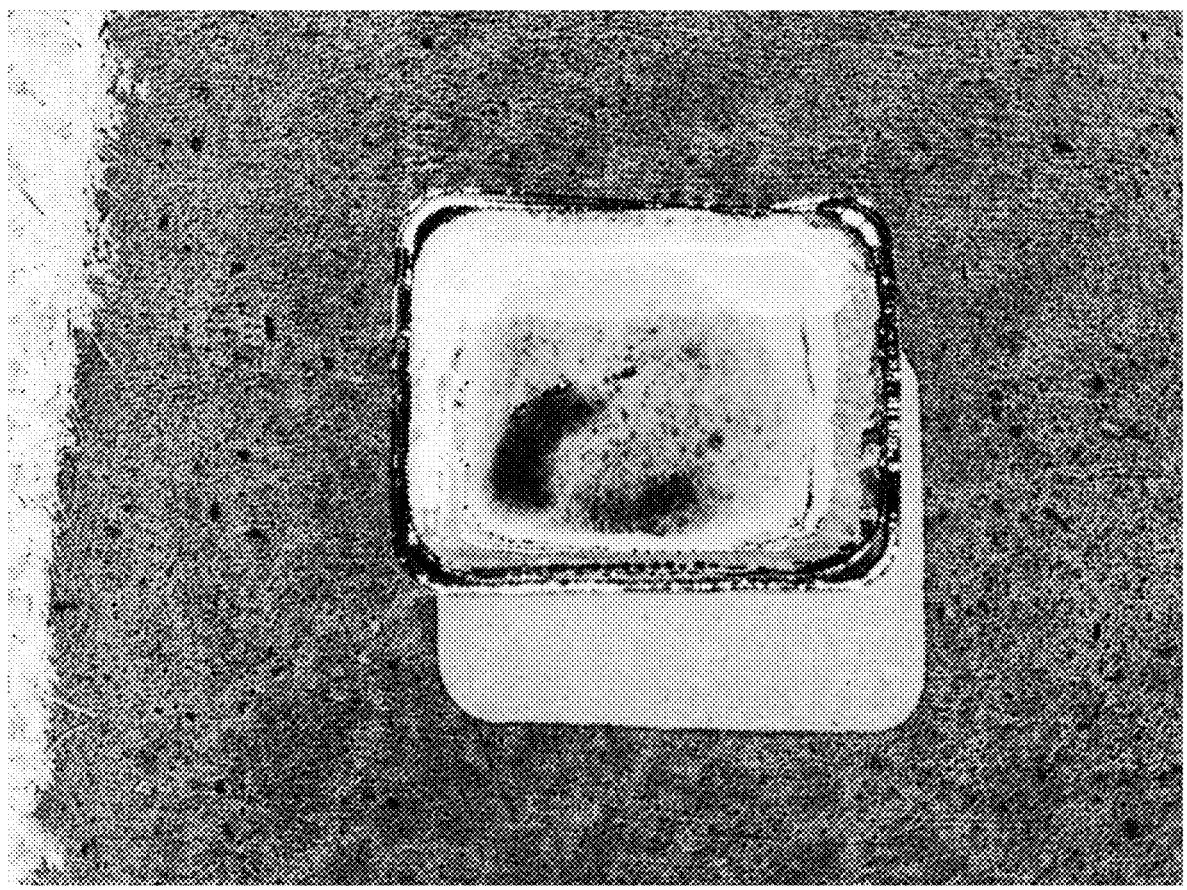
FIG. 4A is the spectral image of a piece of asphalt with an ice sheet partially melted on a flat sidewalk.
Figure 4B:
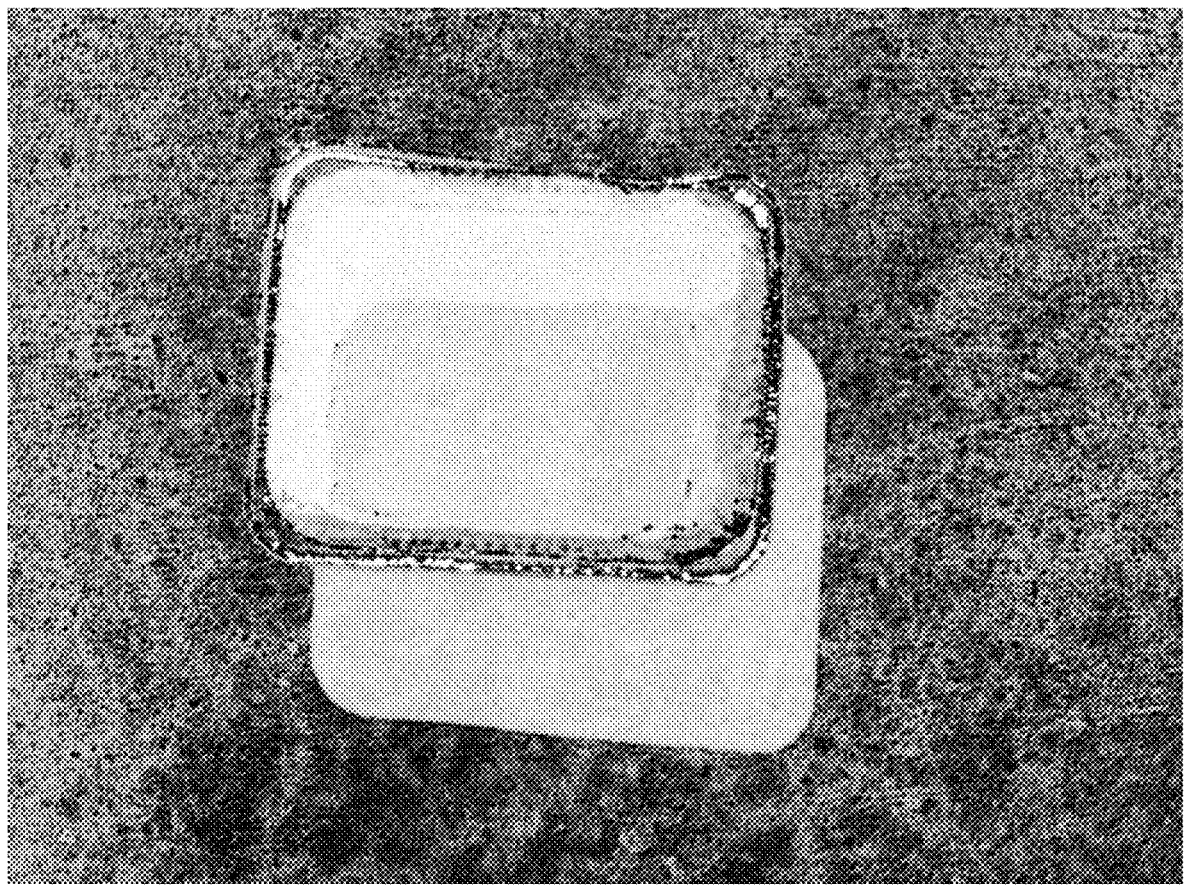
FIG. 4B is the spectral image of a piece of asphalt with an ice sheet completely melted on a flat sidewalk.

Water increases RI as a function of ice and water mixing ratio. After 16 minutes when the ice started to melt (partially melted), the RI ranged from −0.02 to 0.50 (FIG. 4A), a reduction from 0.60 when water was first occurred at the tray (FIG. 3). Furthermore, after 38 minutes when the ice was completely melted, the water cover asphalt had a RI ranging from 0.01 to 0.43 (FIG. 4B). Not only the RI kept reducing on its maximum (0.60 in 8 minutes, 0.50 in 16 minutes to 0.43) but also no negative RI at this point anymore. Such a significant difference can be used to detect ice, ice-water, and water on asphalt road.

TABLE 1

Spectral Reflectance and Index for Road Ice Detection

| Spectral Band | wavelength (um) | MODIS band (um) | MODIS Band No. | Aspen | Asphalt | Melting Snow[1] | Melting Snow[2] | Water | Water + montmor |
|---|---|---|---|---|---|---|---|---|---|
| Blue | 0.46 | 0.459-0.479 | Band 3 | 0.05751 | 0.07024 | 0.55641 | 0.83295 | 0.02092 | 0.15772 |
| Green | 0.55 | 0.545-0.565 | Band 4 | 0.12491 | 0.08558 | 0.57753 | 0.83238 | 0.04683 | 0.17232 |
| Red | 0.66 | 0.620-0.670 | Band 1 | 0.05833 | 0.10392 | 0.56032 | 0.82798 | 0.03503 | 0.15324 |
| NIR | 0.85 | 0.841-0.867 | Band 2 | 0.47559 | 0.12564 | 0.40310 | 0.76514 | 0.20284 | 0.08081 |
| $\frac{NIR - Green}{NIR + Green}$ | | | | 0.7843 | 0.18 | −0.177 | −0.04 | 0.625 | −0.363 |
| $\frac{Green}{Red}$ | | | | 2.14 | 0.823 | 1.03 | 1.05 | 1.509 | 1.12 |
| $\frac{NIR - Green}{NIR + Green} \times \frac{Green}{Red}$ | | | | 1.678 | 0.148 | −0.182 | −0.082 | 0.943 | −0.407 |

Figure 2B:
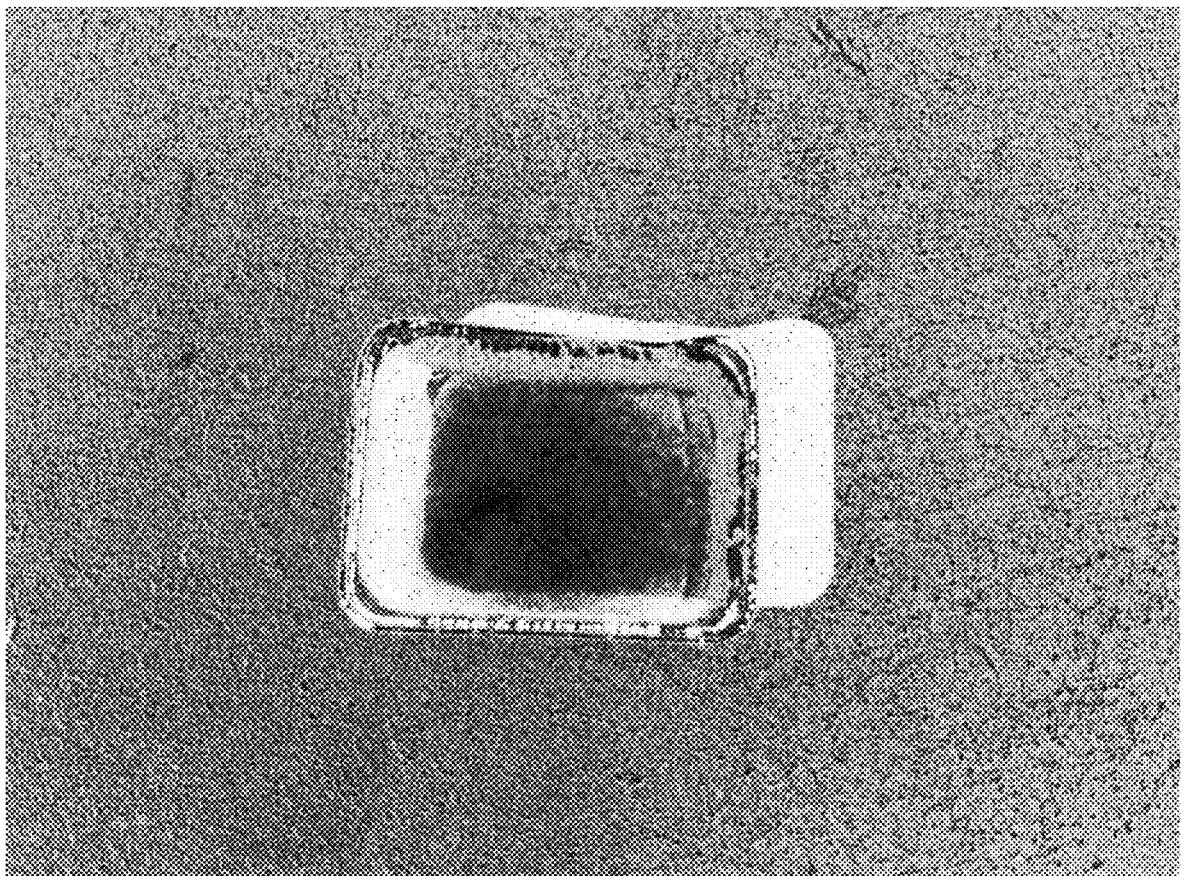
FIG. 2B is the spectral image of a piece of asphalt with an ice sheet on a flat sidewalk.

Once ice sheet, 0.5 cm, was put into the tray (FIG. 2B), the asphalt was covered by ice and the spectral reflectance was evidently changed, with RI ranging from −0.11 to 0.33. Solar zenith angle is around local noon. Two key findings were that (a) the RI index was reduced −0.11; and (b) the maximum value was still 0.33. This is because GREEN and RED reflectance significantly changed when ice occurs and thus RI range was increased (−0.11 to 0.33). Furthermore, a negative value of RI from ice indicated the higher reflectance in visible than in NIR, which is consistent with the snow/ice spectral reflectance shown in FIG. 1.

The clear difference of dry asphalt and ice-covered asphalt on RI can be used to detect ice road.

2. Partly Melt Ice, Asphalt, and Ice

After 8 minutes, ice sheet in the tray partly melted and led a change of spectral reflectance, RI changed to −0.04-0.60, with the ice covered part (left lower corner) having a negative RI and the edge of the ray where water first occurred and accumulate had a high RI up-to 0.60. FIG. 3 shows the spectral image eight minutes after ice put on the tray. Ice sheet was slightly melt. For ice and water mixed regions, the RI was spotty. Note that the shadow of the tray under sunshine also had a high RI, suggesting a larger apart of in GREEN, RED and NIR. Furthermore, water increased maximum RI, evidently, from 0.33 (FIG. 2B) to 0.60, suggesting that the water and ice mixing situation enlarged the differences in spectral reflectance in GREEN, RED, and NIR.

This result suggests that other information, such as thermal threshold based on road surface skin temperature or more spectral reflectance on other channels, would be helpful further identify wet surface versus iced surface.

4. Temperature Threshold

Figure 5:
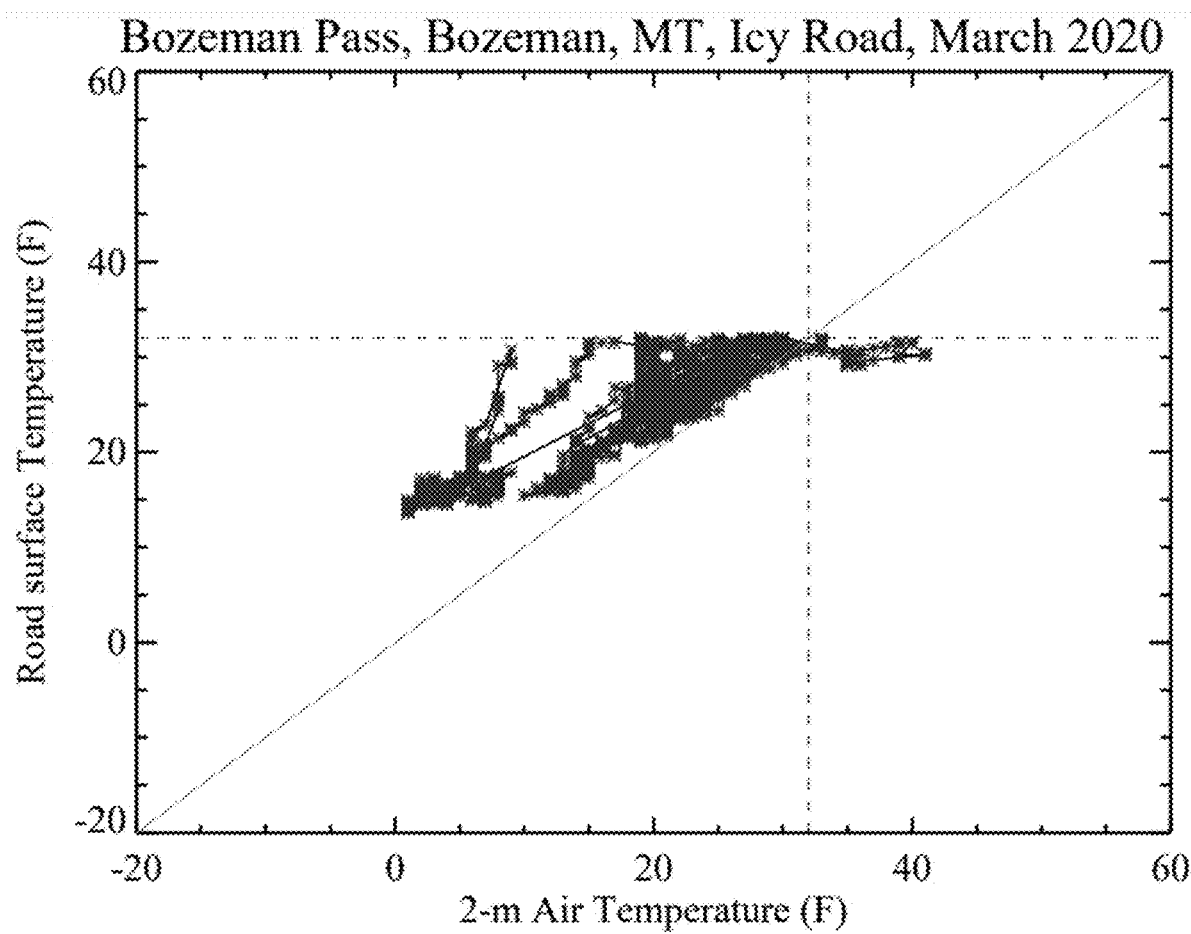
FIG. 5 shows road surface skin temperature and 2-meter air temperature relations for icy road.

FIG. 5 shows road surface skin temperature and 2-meter air temperature relations for icy road. The data is from Road Weather Information System (RWIS), measured by RWIS site ground sensor. Bozeman Pass is one RWIS site built in Montana. The data duration is for March 2020 when road was iced.

Whether snowfall accumulates on road or melts is determined by road surface skin temperature. Nevertheless, traditionally used 2-meter air temperature is not the skin temperature, although they have similar diurnal variation pattern and are closely related to each other as functions of surface insolation, land cover, and soil moisture. Road skin temperature is all below 32° F., the freezing point of water, while 2-meter air temperature could be above 32° F. In conclusion, road skin temperature is a thermal threshold limit for road ice to form. When road skin temperature is above 32° F., the road cannot have ice. This is an important threshold for road ice determination.

5. Integrated technology for Road Ice Detection

Figure 6:
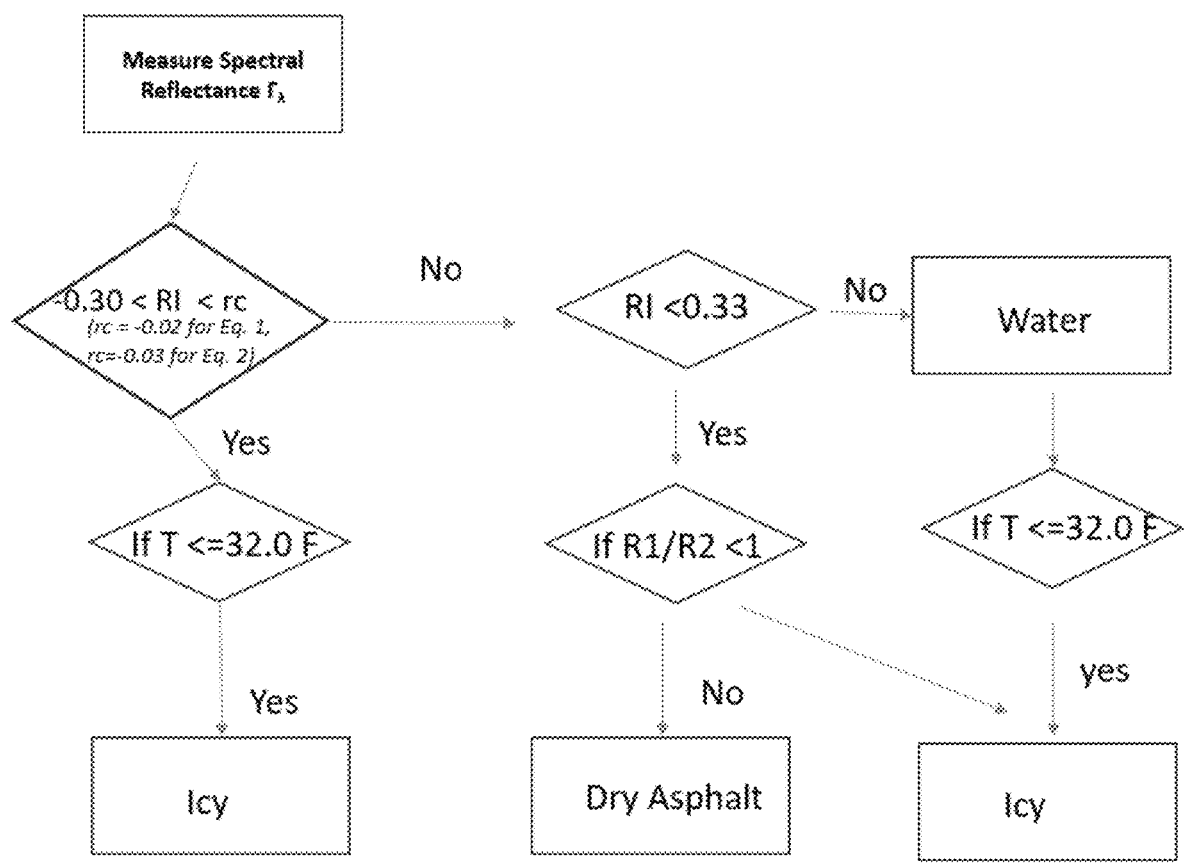
FIG. 6 shows an icy road detection algorithm using spectral reflectance and thermal threshold.

The spectral reflectance in Green, Red, and NIR bands and skin temperature threshold are combined to detect icy status in a road area, as shown in the scientific workflow (FIG. 6). This first-time developed algorithm can be used for remotely sensing ice on road. Local calibration may be needed for specific consideration of land surface heterogeneity, for example, for bridge and mountain roads, the threshold might need to be modified. Furthermore, comparing with the historical image of dry road would be helpful to assess the changes in spectral reflectance in each band and thus improve the accuracy of detection.

FIG. 6 shows a scientific icy road detection algorithm using spectral reflectance and thermal threshold. The reflectance $\Gamma_\lambda$ is measured by a spectral imaging camera. The RI is then calculated by Eq. (1) or Eq. (2). When the RI meets the preset condition (−0.30<RI<rc) and the road surface skin temperature is less than 32 degrees Fahrenheit, road ice is detected. When the RI does not meet the preset condition, a further determination is conducted. When RI is less 0.33 and R1/R2 is less than 1, road ice is detected. When RI is less 0.33 and R1/R2 is equal to or greater than 1, no road ice is detected. When RI is equal to or greater than 0.33 and the road surface skin temperature is less than 32 degrees Fahrenheit, road ice is detected.

Snow age and asphalt road age are not considered here, which affect spectral reflectance in the bands and thus may need further adjustments on the thresholds. At night, light source is needed in order to obtain the spectral reflectance on Green, Red, and NIR bands.

6. A System for Detecting Road Ice by Spectral Imaging

Figure 7:
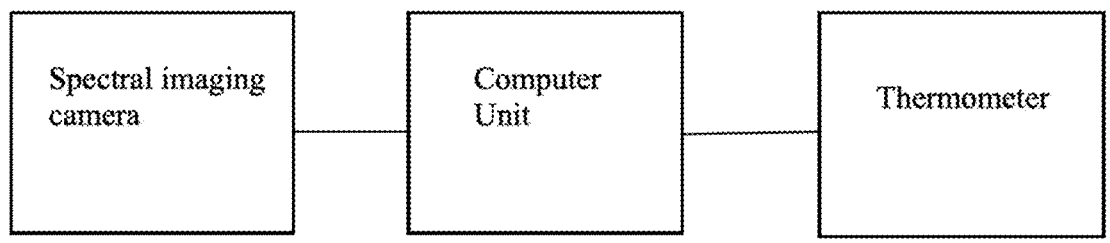
FIG. 7 shows a system for detecting road ice by spectral imaging.

FIG. 7 shows a system for detecting road ice by spectral imaging. The system for detecting an ice on a surface includes a spectral imaging camera, a thermometer, and a computer unit. The spectral imaging camera records a first reflectance (R1) of the surface at a green band, a second reflectance (R2) of the surface at a red band, and a third reflectance (R3) of the surface at a near infrared band. The thermometer records a temperature of the surface. The computer unit calculates an Ice Index based on the first reflectance, the second reflectance, and the third reflectance, and detects a presence of the ice on the surface based on the Ice Index and the temperature of the surface.

7. Drone-Based Spectral Sensor Field Experiment

Research on field studies were conducted to detect road ice from a drone-based spectral sensor.

Figure 8:
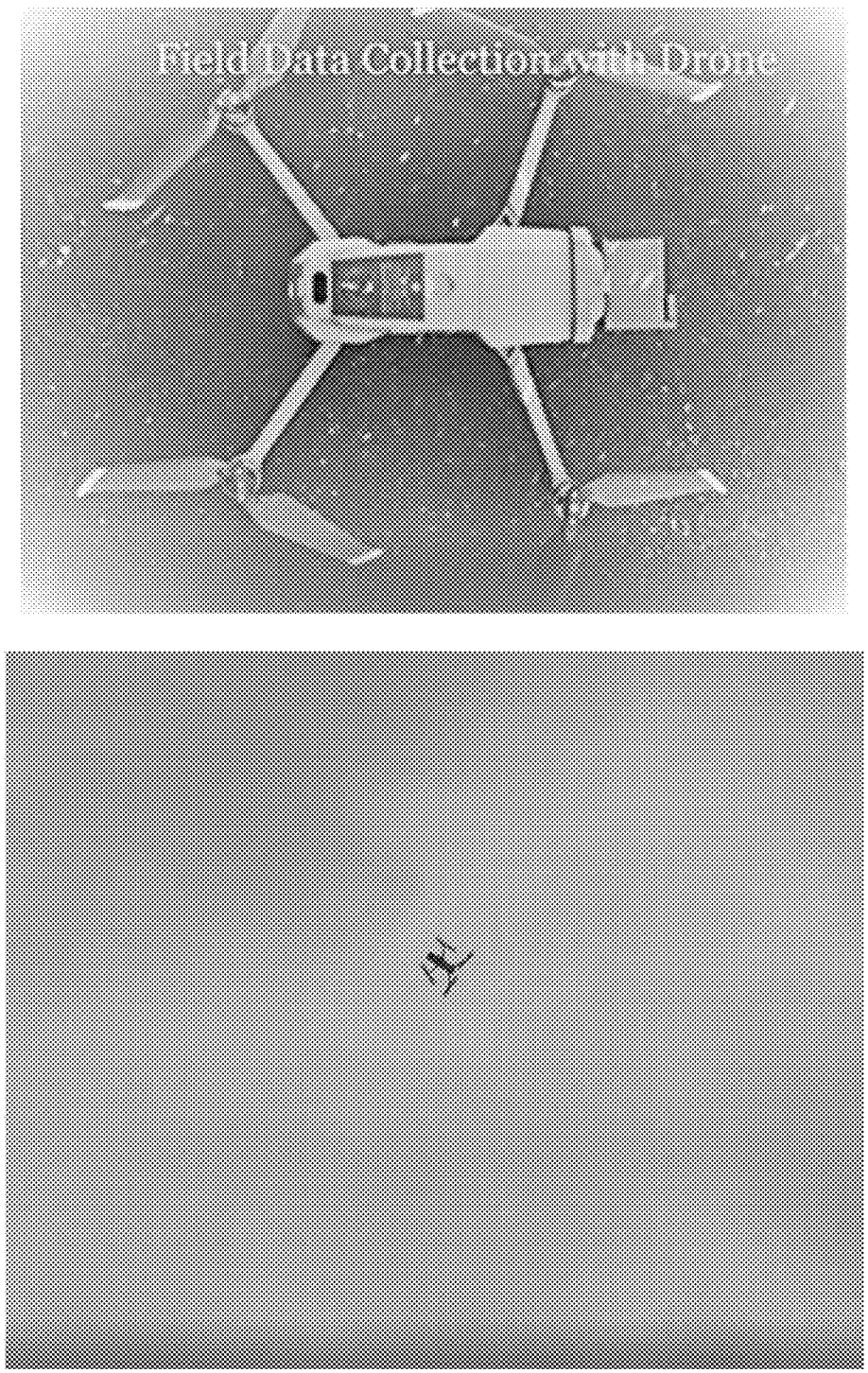
FIG. 8 shows a spectral sensor mounted on DJI drone for field experiments December 2020-February 2021.

Multi-Spectral Survey Camera slightly tilted on the DJI drone (FIG. 8). Specifics of instrument include:

the MAPIR Survey 3N Camera was used to take photographs in Near Infrared (NIR), Green, and Red bands. Near Infrared 850 nm, Green 550 nm, and Red 660 nm. Survery 3N has 41 degree HFOV and 2.5 cm/pixel (120 m AGL).

DJI Mavic pro

MAPIR Survey 3 camera can be easily mounted on DJI Mavic. Camera can have 41 degree field of view (HFOV). Our research found that under nadir, the road ice detection is much accurate. At the edge of image, the Road Ice Index can be mis-calculated—namely, no snow area was calculated as snow, due partly to inaccurate spectral reflectance at the bands and partly to instrument calibration.

8. Different Road Ice Index Assessment

Figure 9:
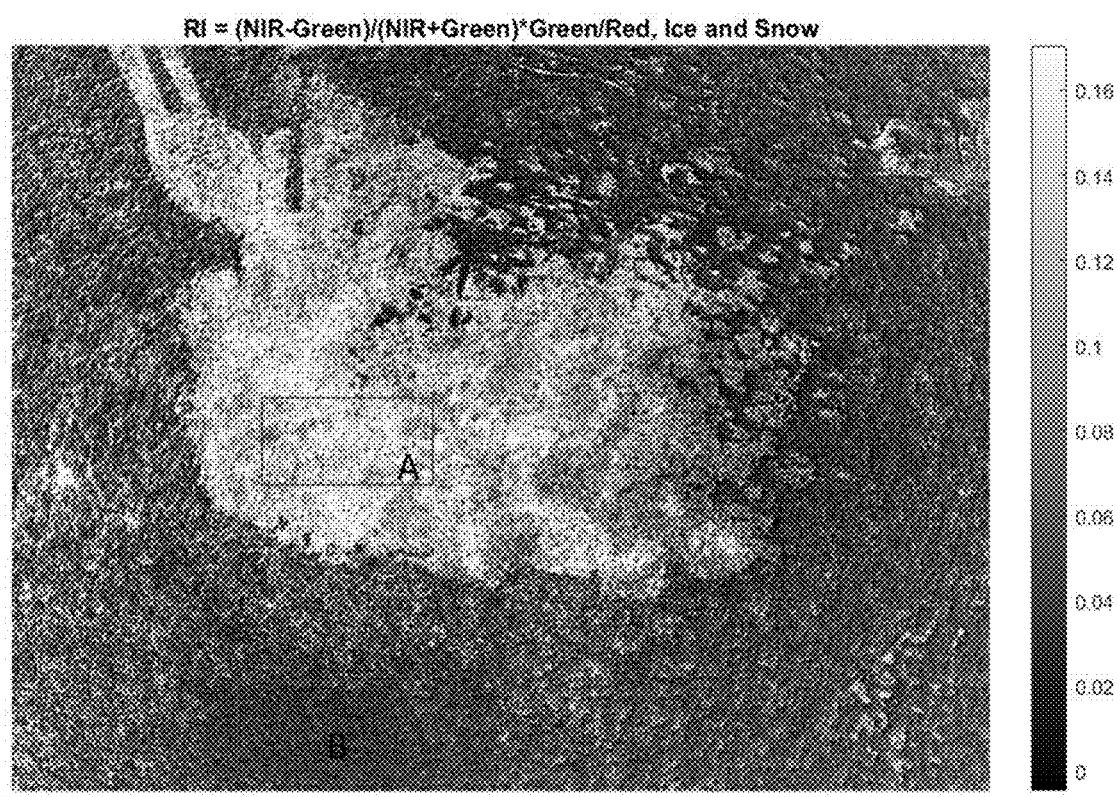
FIG. 9 shows Road Index of Ice and Snow on parking lot. The ice index calculated based on (NIR-Green)/(NIR+Green)*Green/Red.

Field experiments to assess various Road Ice Indexes (RIs) were conducted in December 2020, January and February 2021 in Maryland. Due to the regulation restriction for the drone flight, we did not conduct measurements across highway. Measurements were taken on parking lots and roads in neighborhood. Nevertheless, the data collected proved that:

a. The road ice index designed using NIR, Green and Red band is able to distinguish snow covered region, ice covered region, dry region, and wet region. Nevertheless, dry and iced surfaces would be more challenge to detect from each other b. Black ice detection needs more research c. A ground-based sensor to measure road surface skin temperature would enhance road ice detection, in particular, for distinguishing dry vs iced surfaces The white/black/gray image of road ice index (RI) is an arbitrary image generated to show different RI in relative scale, i.e., mapping RI value to a 0-255 gray scale (FIG. 9). Different color mapping scheme can be used and white/black/gray was chosen in current study. The RI was calculated based on the 3 spectral bands (RED, GREEN, NIR) data. Ice region showed high values (in white) and snow covered region showed in low values (in black). Two areas were highlighted in rectangle boxes (A, and B, respectively). The area darker corresponded to the thicker snow, with a mean of 0.0372 (B, FIG. 9) and the ice region was in white with mean of 0.1266 in ice area.

This experiment showed that RI identified snow and ice covered areas very evidently. The maximum value in this photo was 0.1704 and minimum value was −0.0046. The thicker the snow, the darker the area. White area was ice. In this data collected, the RI of snow area was very close to 0 while the ice area is around 0.1. The difference may be due to the thickness of ice and water under the ice.

Figure 10:
FIG. 10 shows NDVI road ice index of Ice and Snow on parking lot. The ice index calculated based on (NIR-Green)/(NIR+Green)*Green/Red.

Different RI, Enhanced NDVI (ENDVI), which is similar to NDVI but using NIR and Green bands only, was assessed. Using only two bands may be helpful to reduce sensor cost, if this index is adequate for road ice detection. Enhanced NDVI=(Green−Green)/(NIR+Green) was presented in FIG. 10. First, the ENDVI had very similar patterns as the RI index used in FIG. 9. White area for ice region and black region for snow region. Maximum value was 0.197 and the minimum value was −0.0045. The thicker the snow, the darker the area. Area A had averaged values 0.1389, and area B had average 0.0388. Comparing with FIG. 9, the ENDVI RI had the larger spread of values (−0.0045 to 0.197) while the FIG. 9 RI spanned from −0.0046 to 0.1704.

Figure 11:
FIG. 11 shows drone-based road ice detection using Multi-spectral Surveying Camera on Drone at 9:10 am Dec. 19, 2020. Flight height was about 90 feet (27.4 meter). RI index calculated here was RI=(NIR-Green)/(NIR+Green)*Green/Red.

On a parking lot, the snow covered area, ice area, dry area and wet area were distinctively from the spectral camera (FIG. 11). The vegetation cover region, like tree and grasses were also easily differentiated from the camera. The overall image had maximum value of 0.2500 and minimum value of −0.1879. Area A was snow-covered region and RI had low values and thus in black. The averaged value for A was −0.1606. B was a wet region and it was smoothly white with an averaged value of 0.2013. The C box was an iced area, with an averaged value of 0.1411.

Figure 12:
FIG. 12 shows drone-based road ice detection using Multi-spectral Surveying Camera on Drone at 9:10 am Dec. 19, 2020. Flight height was about 90 feet (27.4 meter). The Enhanced NDVI Road Ice (ENDVI RI) Index calculated here was RI=(NIR-Green)/(NIR+Green)*Green/Red.

A similar pattern was shown for ENDVI RI index (FIG. 12). It was easy to distinguish snow, from wet, dry and ice region. Dry region had value between snow (dark, low values) and wet region (white, high values). Ice region was slightly lower value than dry region. The overall image had maximum as 0.3379 and minimum as −0.178. Again, ENDVI RI enlarged the span of the image values, namely −0.178 to 0.3379 vs −0.1606 to 0.25 of FIG. 11 RI index.

9. Snow, Ice, and Wet Roads

Figure 13:
FIG. 13 shows that measurement was taken with Multi-spectral Surveying Camera on Drone at 9:31 am on Dec. 19, 2020. Drone fly height was about 90 feet (27.4 meter). Enhanced NDVI road ice index ENDVI RI=(NIR-Green)/(NIR+Green).

First, wet surface can be easily identified in ENDVI RI index (FIG. 13). The area around the traffic signal arrow were wet and had high values. The snow regions had low values in dark color. The regions near by the middle where the observer standing were ice-covered and the values were smaller than wet but higher than snow. Vegetation and people in purple color coat were not able to be detected in RI. One strength was the foot-prints of the car wheels on the right middle to lower corner were very clear on this RI index. RI index disclosed detailed structure, indicting the ice structure inside these car-footprints. Maximum in this image was 0.2727 and minimum was −0.1967.

Figure 14:
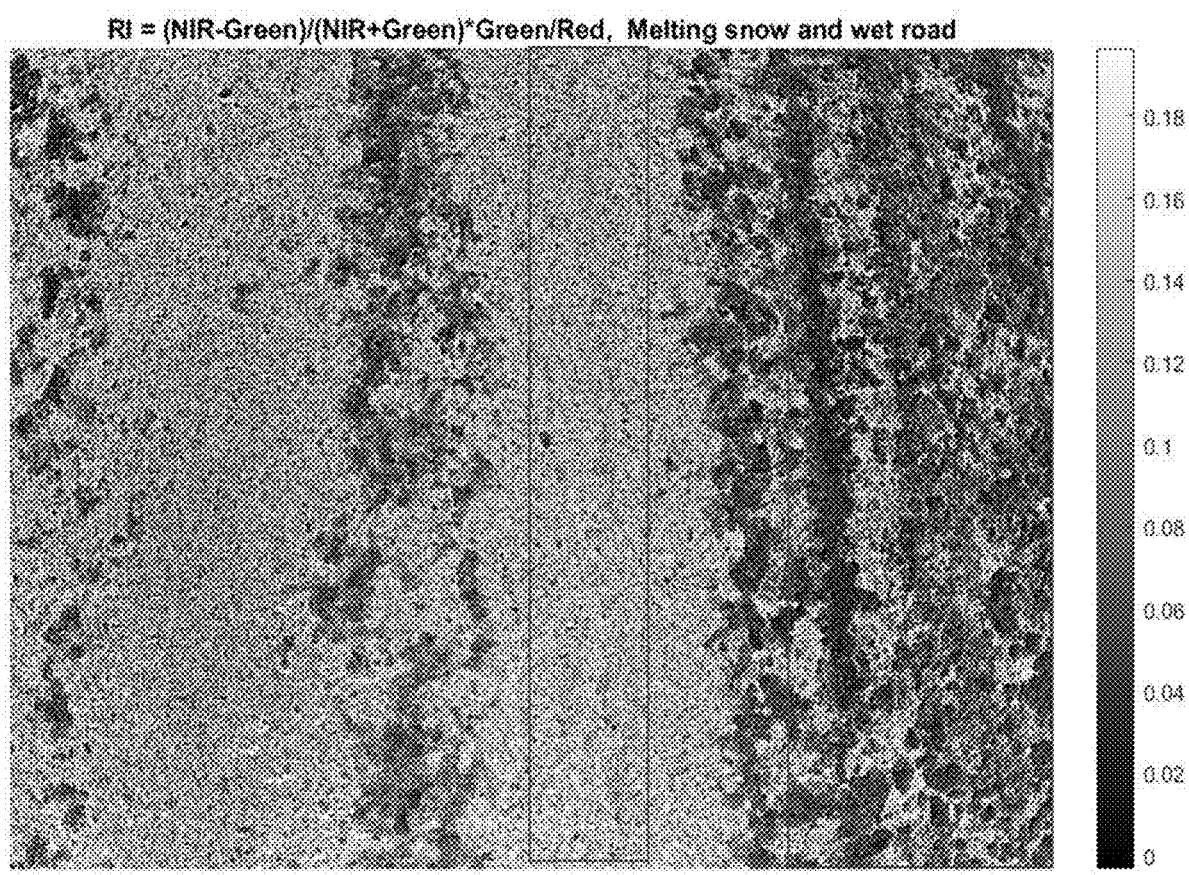
FIG. 14 shows road Index of Melting snow on road. Left box was wet road, and right box was melted snow. Experiment was conducted with Multi-spectral Surveying Camera at 9:59 am, Jan. 31, 2021.

On Jan. 32, 2021, experiment on road traffic-footprints (FIG. 14) showed that the melting snow had averaged value of 0.0736, while the wet road (left box) was 0.1246 on RI. Structure wise, the melting snow and wet roads are clearly distinguishable. Similar patterns were also observed in ENDVI RI image (not shown).

10. Snow and Dry

Figure 15:
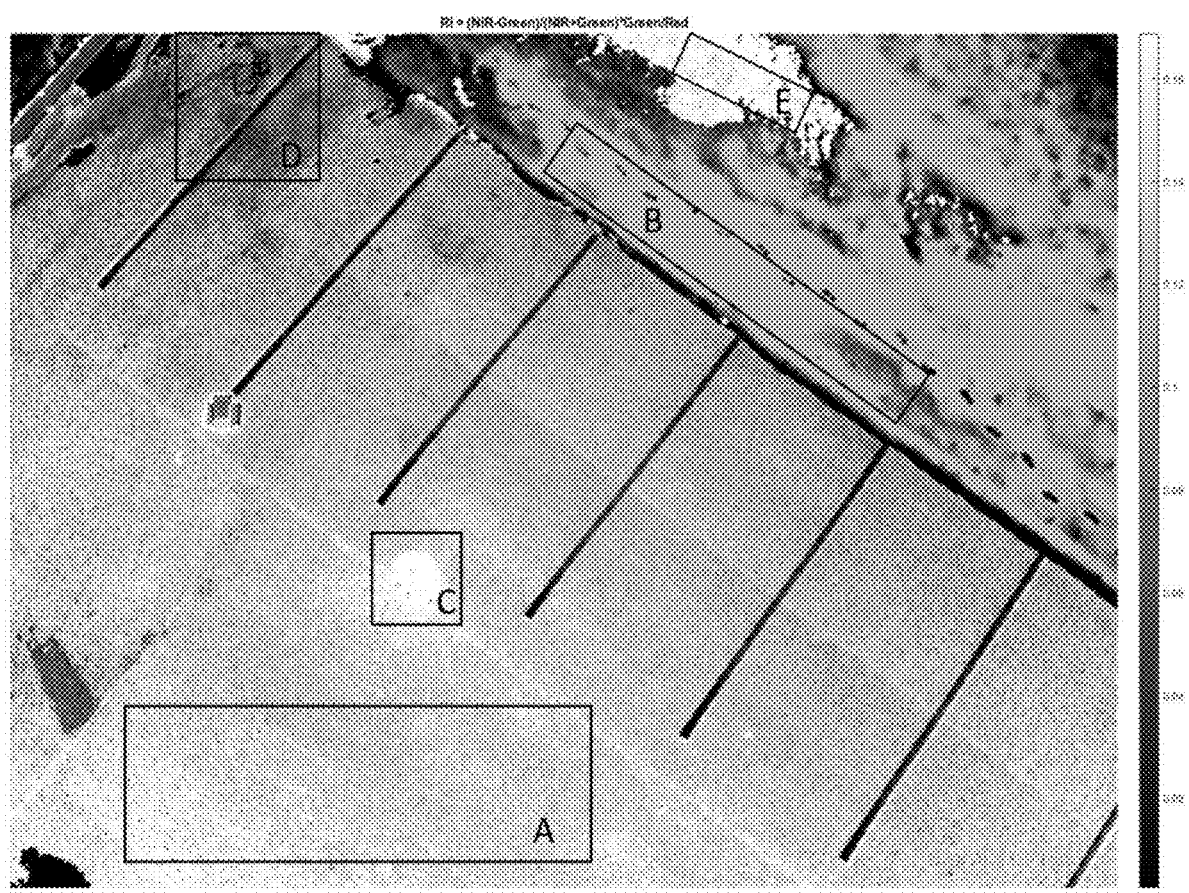
FIG. 15 shows dry parking lot with snow at vegetation region. Field experiment conducted on Multi-spectral Surveying Camera on Drone at 9:11 am Dec. 19, 2020. Flight height was about 90 feet (27.4 meter).

On a dry parking lot, the dry surface had RI averaged of 0.146, with smooth structure as show in A (FIG. 15). The black part in the left bottom was snow and had low value close to 0 (i.e., the minimum of this figure was 0.001). Area D was ice covered region and had RI around 0.04. Area C was where the observer stood, in purple color coat. The vegetation area (E) had high values above 0.16 and looked white in this Figure. The snow covered area (B), however, had average of 0.18, which was a mis-calculation due partly to the view angle at edge that made a snow region looked like a dry region.

11. Effects of Drone Flying Height on Accuracy

Height of drone that flying affects the observations accuracy. When taken from 20 feet, the accuracy of drone camera-based RI was less than taken at 5 feet. Specifically, the road ice index was maximum of −0.2595, minimum of −0.4778 and snow area mean=−0.4121 for 20-feet experiment. When taken at height of 5 feet, the maximum was −0.3345, minimum was −0.4887, and snow averaged value was −0.4219, with variance of 0.0011. This suggests that the height (5 feet vs 20 feet) has certain effects on accuracy but does not make evident difference in distinguishing snow. The slight shift of RI value may be due to the view angle or other rea-sons.

12. Summary of RI

Table 2 is a summary for the RI thresholds based on our field experiments.

TABLE 2

| Road Condition | RI from Camera hold by hand | RI from Camera mounted on Drone |
| --- | --- | --- |
| Dry | [0.20, 0.24] | [0.11, 0.16] |
| Ice | 0.14 | [0.06, 0.15] |
| Snow | [0.01, 0.04] | [−0.16, −0.42] |
| Wet | [0.07, 0.08] | [0.12, 0.25] |

As shown in Table 2, RI can be used to differentiate road conditions. The values for Snow, Dry, and Wet condition were shifted when multi-spectral camera is mounted on drone, which needs further investigation whether the view angle or other factors caused such a shift. Nevertheless, the snow-covered surface had the lowest RI values and the wet surface had the highest RI values seemed to be consistently observed and thus could be used to distinguish these surfaces. More data on ice needs to be collected. In addition, the RI on ice was different from Ice Tray test collected before which may be caused by different thickness of ice, or the factor that road ice is often mixed with snow/water. If road surface skin temperature measurement is available, it would enhance the algorithm to distinguish wet, dry, and ice surfaces. For this purpose, a ground-based IR skin temperature sensor was designed. Most importantly, the thresholds in the above table should only be used as proof that snow, ice, dry and wet roads have different spectral reflectance that can be used to identify one from another, but should not be used as a standard. The values here may include local geometry effects and thus may not be directly used in other locations. Furthermore, one needs to not only use the RI values, but also pay attention on the structure and pattern of the RI across the image, for example, the smoothness of the value distribution also provides useful information.

13. Automated and Adaptive Ground IR sensor

Figure 16:
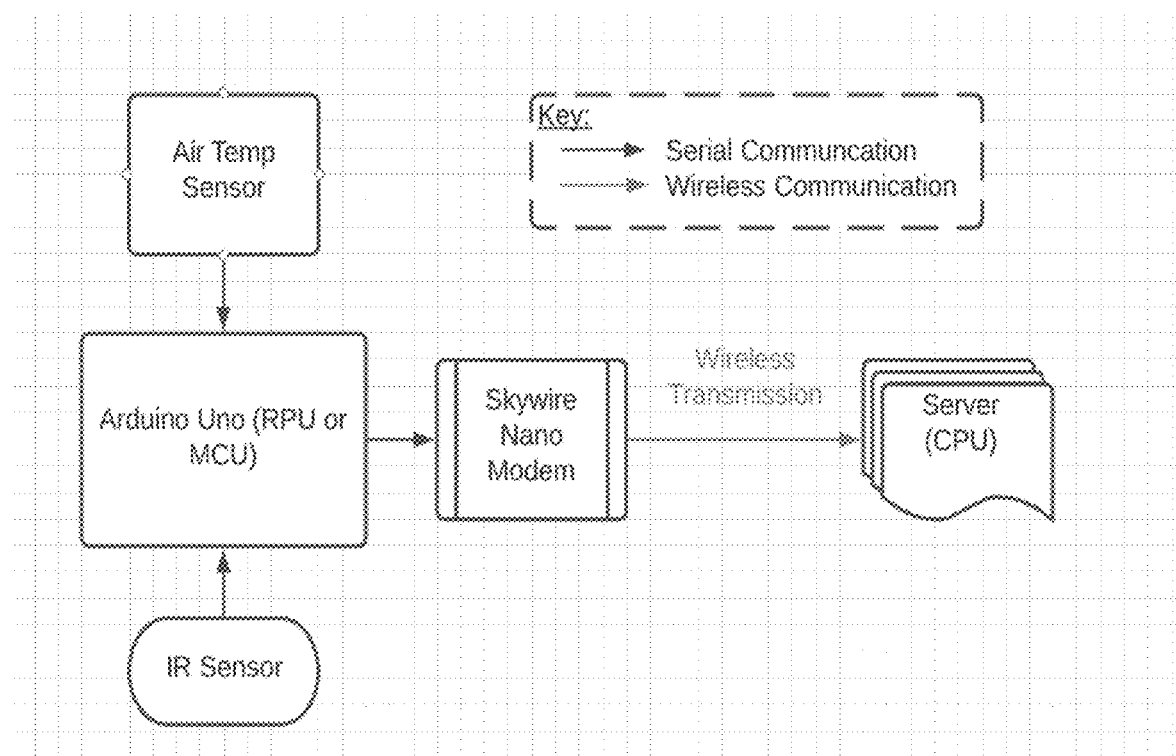
FIG. 16 shows the framework of a ground IR sensor.

To complete road ice detection technology, road skin temperature and air temperature are both needed to be measured. SpringGem developed a ground-based, solar-panel powered, water-proof, completely automatic IR sensor system to measure skin temperature and 2-meter air temperature simultaneously (FIG. 16).

Figure 17:
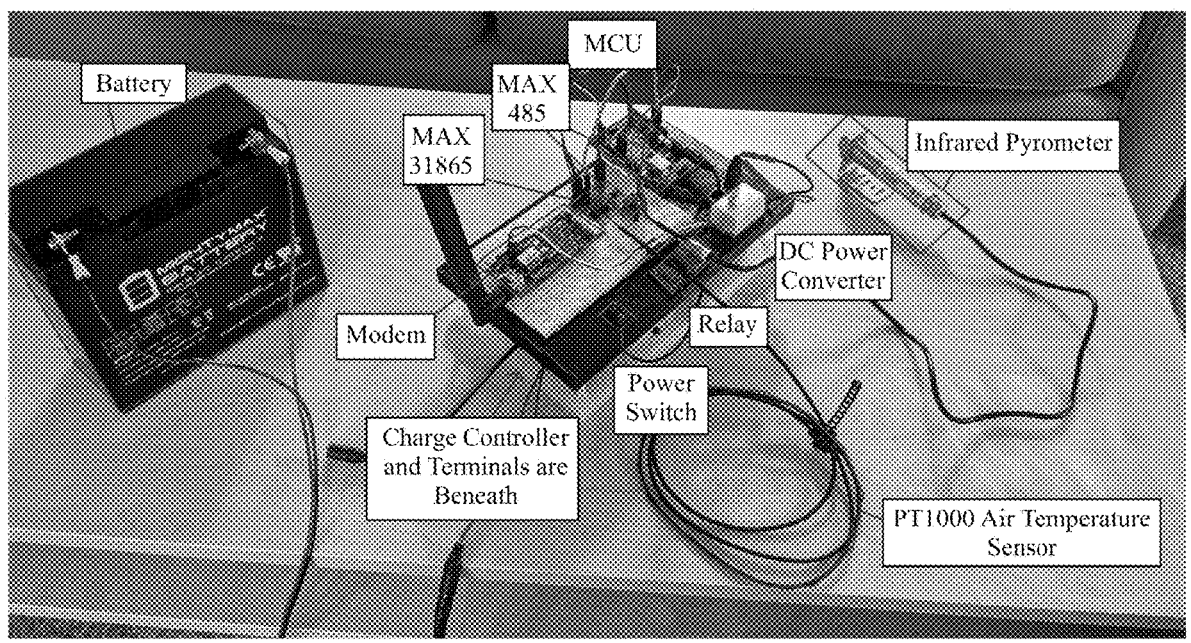
FIG. 17 shows a prototype of IR Sensor for skin and air temperatures measurements, before be mounted alongside the rest of the device (solar panel, etc.) at a safe distance several meters above the ground.

FIG. 17 shows a prototype of IR Sensor for skin and air temperatures measurements. The strengths of IR sensor are the followings:

Entirely Remote

Minimizing maintenance visit is a priority in our sensor design. To make the sensor completely remote, self-powered function is ingested, requiring no visits from technicians and allowing easy installation. It communicates with PPU and CPU wirelessly, removing the need for it to be physically attached to the internet via cable. In addition, it requires no constant calibration or repair, allowing users to set the sensor and have it run without interference. Finally, the sensor requires no further maintenance after an initial calibration. The software for the device was written by SpringGem Weather Information, LLC and operates on an Arduino microcontroller. The PT1000 only requires calibration dependent on the device itself, and no further calibration in the field. The IR sensor will require an initial calibration and testing, and then would function in perpetuity. To protect from the weather, all internal components are contained within an IP 65+enclosure, and all external components will share this rating.

Adjustable, Affordable and Adaptive Design with 3-D Printing

Growing technologies to lower costs and manufacture times are designed for industry users who may need hundreds of sensors on the state. The electronics of the device are mounted in an enclosure that is designed and 3D printed within a week. The combination of CAD (computer assisted design) and 3D printing allows for quick and cost efficient prototyping and alterations, and therefore easy modification to new requirements in the design without large costs and delays. 3-D printing make the sensor in particular adaptive to customers' needs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method for detecting an ice on a surface comprising:
providing a spectral imaging camera;
recording a first reflectance (R1) of the surface at a green band using the spectral imaging camera;
recording a second reflectance (R2) of the surface at a red band using the spectral imaging camera;
recording a third reflectance (R3) of the surface at a near infrared band using the spectral imaging camera;
calculating an Ice Index based on the first reflectance, the second reflectance, and the third reflectance;
providing a thermometer;
recording a temperature of the surface using the thermometer; and
detecting a presence of the ice on the surface based on the Ice Index and the temperature of the surface,
wherein the Ice Index is calculated by a following Equation (2):

$$\text{the Ice Index} = (R3-R1)/(R3+R1)*(R1/R2) \quad \text{Equation (2)}.$$

2. The method of claim 1, wherein the green band has a band width of 0.545 to 0.565 μm.

3. The method of claim 1, wherein the red band has a band width of 0.620 to 0.670 μm.

4. The method of claim 1, wherein the near infrared band has a band width of 0.841 to 0.876 μm.

5. The method of claim 1, wherein the surface is a road surface.

6. The method of claim 1, wherein the presence of the ice on the surface is detected when the Ice Index is between −0.30 to −0.03 using Equation (2), and the temperature of the surface is less than 32 degrees Fahrenheit.

7. The method of claim 1, wherein the temperature of the surface is a road surface skin temperature.

8. The method of claim 1, wherein the spectral imaging camera is mounted on a drone.

9. A system for detecting an ice on a surface comprising:
- a spectral imaging camera, the spectral imaging camera recording a first reflectance (R1) of the surface at a green band, a second reflectance (R2) of the surface at a red band, and a third reflectance (R3) of the surface at a near infrared band;
- a thermometer, the thermometer recording a temperature of the surface; and
- a computer unit, the computer unit calculating an Ice Index based on the first reflectance, the second reflectance, and the third reflectance, and detecting a presence of the ice on the surface based on the Ice Index and the temperature of the surface,
- wherein the Ice Index is calculated by a following Equation (2):

$$\text{the Ice Index} = (R3-R1)/(R3+R1)*(R1/R2) \qquad \text{Equation (2).}$$

10. The system of claim 9, further comprising a drone, wherein the spectral imaging camera is mounted on the drone.

* * * * *